United States Patent [19]

Yoshimura et al.

[11] Patent Number: 4,727,252
[45] Date of Patent: Feb. 23, 1988

[54] RADIATION IMAGE ERASE UNIT FOR USE WITH STIMULABLE PHOSPHOR SHEET

[75] Inventors: Ryoichi Yoshimura; Yasuhiro Kawai, both of Kanagawa, Japan

[73] Assignee: Fuji Photo Film Co., Ltd., Kanagawa, Japan

[21] Appl. No.: 789,800

[22] Filed: Oct. 21, 1985

[30] Foreign Application Priority Data

Oct. 20, 1984 [JP] Japan ................... 59-220676
Oct. 20, 1984 [JP] Japan ................... 59-220673
Oct. 20, 1984 [JP] Japan ................... 59-220674
Oct. 20, 1984 [JP] Japan ................... 59-220675

[51] Int. Cl.$^4$ .............................. G01T 1/105
[52] U.S. Cl. .................. 250/327.2; 250/484.1; 271/248; 271/253
[58] Field of Search ......... 250/327.2, 337, 484.1; 355/30; 362/218, 264, 345; 271/253, 248

[56] References Cited

U.S. PATENT DOCUMENTS

| | | | |
|---|---|---|---|
| 3,444,372 | 5/1969 | Dehart | 250/483.1 |
| 3,779,640 | 12/1973 | Kidd | 355/8 |
| 3,941,471 | 3/1976 | Schatka et al. | 355/3 R |
| 4,098,458 | 7/1978 | Auchinleck | 235/475 |
| 4,258,264 | 3/1981 | Kotera et al. | 250/484.1 |
| 4,350,893 | 9/1982 | Takahashi et al. | 250/484.1 |
| 4,400,619 | 8/1983 | Kotera et al. | 250/327.2 |
| 4,602,157 | 7/1986 | Kayser | 250/327.2 |

FOREIGN PATENT DOCUMENTS

3112962 10/1982 Fed. Rep. of Germany ...... 362/218
0011395 2/1981 Japan ...................... 250/327.2

Primary Examiner—Janice A. Howell
Assistant Examiner—Constantine Hannaher
Attorney, Agent, or Firm—Sughrue, Mion, Zinn, Macpeak and Seas

[57] ABSTRACT

A radiation image erase unit for erasing a radiation image from a stimulable phosphor sheet by exposing the same to erasure light in a radiation image read-out system having an image read-out unit for radiating stimulating rays to the stimulable phosphor sheet to cause the same to emit light representative of the radiation image stored therein, and for converting the emitted light photoelectrically to an electric signal. The radiation image erase unit includes a casing including a side panel having openings defined therein, a plurality of erase light sources disposed in the casing, a feed mechanism disposed in or outside the casing for delivering the stimulable phosphor sheet to a prescribed position in the casing, and forced-cooling air blowers having outlets disposed in the openings, respectively, of the side panels and directed toward the stimulable phosphor sheet positioned in the casing. The radiation image erase unit also includes a baffle member for preventing the stimulable phosphor sheet from rising or flying up by air discharged from the forced-cooling air blowers, and/or a blow-away prevention plate for preventing the stimulable phosphor sheet from being displaced and for permitting the stimulable phosphor sheets with remaining images removed therefrom to be accurately sorted out according to their size.

19 Claims, 15 Drawing Figures

RADIATION IMAGE ERASE UNIT FOR USE WITH STIMULABLE PHOSPHOR SHEET

BACKGROUND OF THE INVENTION

The present invention relates to a radiation image erase unit for erasing remaining radiation image information from a stimulable phosphor sheet by exposing the stimulable phosphor sheet to erasing light emitted from an erase light source, and more particularly to a radiation image erase unit for use with stimulable phosphor sheets which includes an air blower means for cooling the stimulable phosphor sheets that is disposed in a casing surrounding the erase light source.

There has in recent years been proposed a radiation image recording and reproducing system in which an irradiation image of an object can be produced by using a stimulable phosphor. The stimulable phosphor, when exposed to a radiation such as X-rays, α-rays, β-rays, γ-rays, cathode rays, or ultraviolet rays, stores a part of the energy of the radiation. When the stimulable phosphor exposed to the radiation is exposed to stimulating rays such as visible light, the stimulable phosphor emits light in proportion to the stored energy of the radiation.

The radiation image recording and reproducing system employs such a stimulable phosphor. More specifically, the radiation image of an object such as a human body is stored in a sheet having a layer of stimulable phosphor (hereinafter referred to as a "stimulable phosphor sheet" or a "phosphor sheet"), and then the stimulable phosphor sheet is scanned with stimulating rays such as a laser beam to cause the stimulable phosphor sheet to emit light representative of the radiation image. The emitted light is then photo-electrically detected and converted to an electric image signal which is processed to reproduce a visible image on a recording medium such as a photographic film material or on a display unit such as a cathode ray tube (CRT). The aforesaid radiation image recording and reproducing system is disclosed in U.S. Pat. No. 4,258,264 and Japanese Laid-Open Patent Publication. No. 56-11395, for example.

The radiation image recording and reproducing system of the type described above is of greater practical advantage than conventional radiographic systems using a combination of an intensifying screen and an X-ray film in that images can be recorded in a wide range of radiation exposure. More specifically, it is known that the amount of light emitted from a stimulable phosphor upon stimulation thereof is proportional in a highly wide range to the amount of radiation to which the stimulable phosphor has been exposed. Therefore, even if the amount of radiation to which the stimulable phosphor is exposed varies widely under various conditions, radiation images free from such exposure variations can be obtained by selecting a suitable read-out gain in the photoelectric transducer for reading and converting the emitted light into an electric signal, and processing the electric signal into a visible image on a recording medium such as photographic film material or on a display unit such as a CRT.

The radiation image recording and reproducing system is capable of processing a converted electric signal to produce a visible image on a recording medium or a display unit so that the radiation image can well be observed for diagnostic purpose. In this system, the stimulable phosphor sheet does not serve as a final image recording medium, but as a temporary image storage medium for eventually transferring images to the final recording medium or display unit. Therefore, the stimulable phosphor sheet can be used repeatedly, and is economical and convenient if in repetitive use.

To reuse the stimulable phosphor sheet, the remaining radiation energy on the stimulable phosphor sheet after the radiation image has been read out by stimulating rays is discharged by exposure to light, and the stimulable phosphor sheet is employed again for recording a radiation image thereon. The erasure of the irradiation energy from the stimulable phosphor sheet is disclosed in U.S. Pat. No. 4,400,619, for example.

The image erasure unit has erase light sources capable of irradiating the stimulable phosphor sheet with a high illuminance for substantially thoroughly discharging any remaining radiation energy from the sheet. In order to erase the remaining image information completely and in a short time from the phosphor sheet with the erasure light, an increased number of erasure light sources and an increased amount of erasure light should be employed to generate intensive erasure light. The increased number of erasure light sources and the increased amount of erasure light, however, tend to heat the image erasure unit excessively, resulting in damage to the image erase unit, the sheet, and the surrounding components.

As disclosed in U.S. Pat. No. 4,350,893, the stimulable phosphor sheet comprises a a support made of paper or a high polymeric organic material such as polyethylene terephthalate, and a phosphor layer deposited on the support. The phosphor layer is composed of a binder made of high polymeric organic material such as nitrocellulose, and stimulable phosphor particles dispersed in the binder. A transparent protective layer is deposited on the surface of the phosphor layer which is opposite to the support for physically or chemically protecting the phosphor layer. The protective layer is also made of a high polymeric organic material such as polyethylene terephthalate. Since the stimulable phosphor sheet is composed of organic materials that are easily susceptible to thermally induced deformation and/or property modification, thereon, when subject to excess heat from the erase light sources, the stimulable phosphor sheet is apt to be deformed and/or modified, and hence cannot be reused as desired. Inasmuch as the image erasure unit is employed for erasing a remaining radiation image from the stimulable phosphor sheet after the radiation image information has been read therefrom, the image erasure unit should preferably be assembled in the radiation image read-out device. In order to allow the image erasure unit to be easily installed in position and also to make the entire system compact, it is necessary that the image erasure unit itself be small in size. The applicant has already proposed such a compact image erasure unit of the box shape including a casing accommodating erase light sources and feed means disposed within or without the casing for feeding the stimulable phosphor sheet to a desired position (see U.S. pat. application No. 740,459).

The proposed box-type image erasure unit is however disadvantageous in that the stimulable phosphor sheet is more likely to be adversely affected by the heat given off by the erase light sources.

SUMMARY OF THE INVENTION

It is an object of the present invention to provide a radiation image erase unit for stimulable phosphor sheets which is compact in structure, and is capable of preventing the stimulable phosphor sheet from being damaged by the heat emitted from erase light sources, and of erasing remaining image information from the stimulable phosphor sheet at an optimum temperature.

Another object of the present invention is to provide a radiation image erase unit for stimulable phosphor sheets which prevents the stimulable phosphor sheet or erase light sources from being subject to damage which would otherwise result from rising movement of the sheet into contact with the erase light sources during an image erasure process.

Still another object of the present invention is to provide a radiation image erase unit for stimulable phosphor sheets which is compact in structure, is capable of preventing the stimulable phosphor sheet from being damaged by the heat applied from erase light sources through the intermediary of forced cooling air, of preventing the stimulable phosphor sheet from being blown away by the cooling air, and of feeding the stimulable phosphor sheets so as to be reliably positioned for allowing them to be accurately sorted out according to their size at a next processing station.

A still further object of the present invention is to provide a radiation image erase unit for erasing a radiation image from a stimulable phosphor sheet by exposing the same to erasure light in a radiation image read-out system having an image read-out unit for radiating stimulating rays to the stimulable phosphor sheet to cause the same to emit light representative of the radiation image stored therein, and for converting the emitted light photoelectrically to an electric signal, the radiation image erase unit comprising: a casing including a side panel having openings defined therein; a plurality of erase light sources disposed in the casing; feed means disposed in or outside the casing for delivering the stimulable phosphor sheet to a prescribed position in the casing; and forced cooling means having outlets disposed in the openings, respectively, of the side panels and directed toward the stimulable phosphor sheet positioned in the casing.

Still another object of the present invention is to provide a radiation image erase unit for erasing a radiation image from a stimulable phosphor sheet by exposing the same to erasure light in an irradiation image read-out system having an image read-out unit for radiating stimulating rays to the stimulable phosphor sheet to cause the same to emit light representative of the radiation image stored therein, and for converting the emitted light photoelectrically to an electric signal, the radiation image erase unit comprising: a casing including a side panel having openings defined therein; a plurality of erase light sources disposed in the casing; feed means disposed in or outside the casing for delivering the stimulable phosphor sheet to a prescribed position in the casing; forced cooling means having outlets disposed in the openings, respectively, of the side panels and directed toward the stimulable phosphor sheet positioned in the casing; and a baffle member disposed in the casing between the erase light sources and the stimulable phosphor sheet positioned in the casing.

A still further object of the present invention is to provide a radiation image erase unit for erasing a radiation image from a stimulable phosphor sheet by exposing the same to erasure light in a radiation image read-out system having an image read-out unit for radiating stimulating rays to the stimulable phosphor sheet to cause the same to emit light representative of the radiation image stored therein, and for converting the emitted light photoelectrically to an electric signal, the radiation image erase unit comprising: a casing including a side panel having openings defined therein; a plurality of erase light sources disposed in the casing; feed means disposed in or outside the casing for delivering the stimulable phosphor sheet to a prescribed position in the casing; forced cooling means having outlets disposed in the openings, respectively, of the side panels and directed toward the stimulable phosphor sheet positioned in the casing; discharge means mounted on the casing for forcibly discharging heat out of the casing; and a temperature sensor disposed in or outside the casing for controlling the operation of the forced cooling means and/or the discharge means.

A yet still further object of the present invention is to provide a radiation image erase unit for erasing a radiation image from a stimulable phosphor sheet by exposing the same to erasure light in a radiation image read-out system having an image read-out unit for radiating stimulating rays to the stimulable phosphor sheet to cause the same to emit light representative of the irradiation image stored therein, and for converting the emitted light photoelectrically to an electric signal, the radiation image erase unit comprising: a casing including a side panel; a plurality of erase light sources disposed in the casing; feed means disposed in or outside the casing for delivering the stimulable phosphor sheet to a prescribed position in the casing; and forced cooling means mounted on the side panel and directed toward the erase light sources.

Still another object of the present invention is to provide a radiation image erase unit for erasing a radiation image from a stimulable phosphor sheet by exposing the same to erasure light in a radiation image read-out system having an image read-out unit for radiating stimulating rays to the stimulable phosphor sheet to cause the same to emit light representative of the radiation image stored therein, and for converting the emitted light photoelectrically to an electric signal, the radiation image erase unit comprising: a casing including a side panel having openings defined therein; a plurality of erase light sources disposed in the casing; feed means disposed in or outside the casing for delivering the stimulable phosphor sheet to a prescribed position in the casing; forced cooling means having outlets disposed in the openings, respectively, of the side panels and directed toward the stimulable phosphor sheet positioned in the casing; and a blow-away prevention device having a blow-away prevention plate located in confronting relation to the outlets of the forced cooling means and displaceable into the casing dependent on the size of the stimulable phosphor sheet for preventing the stimulable phosphor sheet from being blown away by air discharged by the forced cooling means.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
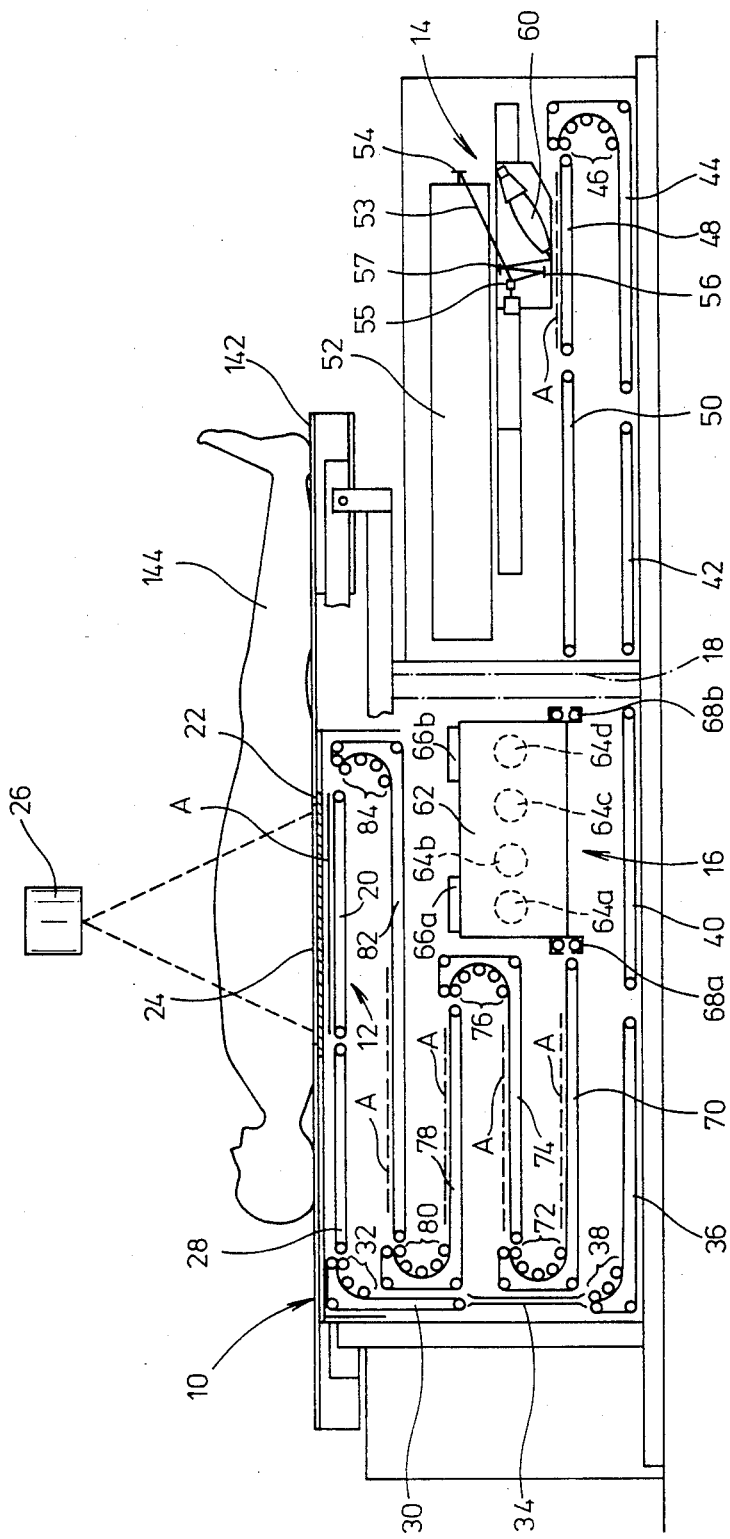
FIG. 1 is a schematic longitudinal cross-sectional view of a radiation image recording and read-out apparatus incorporating an irradiation image erase unit according to the present invention.

Like or corresponding reference characters denote like or corresponding parts throughout the views.

A radiation image recording and read-out apparatus comprising an image recording unit, an image read-out unit, and an image erasure unit according to the present invention and in which a plurality of stimulable phosphor sheets are cyclically used will be described hereinbelow with reference to FIG. 1.

The radiation image recording and read-out apparatus, generally denoted at 10, is of a horizontally elongate shape for supporting an object 144 such as a patient lying thereon. The radiation image recording and read-out apparatus 10 is generally composed of an image recording unit 12, an image read-out unit 14, and an image erase unit 16 for completely erasing a remaining radiation image from a stimulable phosphor sheet to make the stimulable phosphor sheet ready for recording a radiation image thereon. The image read-out unit 14 has a light shielding member 18 which optically separates the image read-out unit 14 from the image erase unit 16 for preventing the entry of light tending to cause noise. The image recording unit 12 has a first belt conveyor 20 for positioning a stimulable phosphor sheet A and a grid 22 disposed above the first belt conveyor 20 for preventing a radiation from being scattered. A photographing device 26 including a radiation source is positioned above a picture-taking plane 24 of the image recording unit 12.

The image recording unit 12 also has a second belt conveyor 28 disposed near the first belt conveyor 22, and a bent third belt conveyor 30 located adjacent to the second belt conveyor 28. A first group of three rollers 32 is disposed against the bent portion of the third belt conveyor 30. Below the third belt conveyor 30, there are guide plates 34 positioned upwardly of a bent fourth belt conveyor 36 having a bent portion against which a second group of three rollers 38 is held. A fifth belt conveyor 40 is located adjacent to the fourth belt conveyor 36 and also adjacent to a sixth belt conveyor 42 in the image read-out unit 14. The end of the sixth belt conveyor 42 remote from the fifth belt conveyor 40 is disposed closely to a bent seventh belt conveyor 44. A third group of rollers 46 is held against a bent portion of the seventh belt conveyor 44. The outlet end of the seventh belt conveyor 44 near the rollers 46 is followed by a straight eighth belt conveyor 48 and a straight ninth belt conveyor 50. Above the belt conveyors 48, 50, there are provided a laser beam source 52 and an optical system for transversely scanning the stimulable phosphor sheet A on the belt conveyor 48 with an output laser beam 53 from the laser beam source 52. The optical system includes a mirror 54, a galvanometer mirror 55, a mirror 56, and a mirror 57. The end of the ninth belt conveyor 50 remote from the eighth belt conveyor 48 is directed toward the image erase unit 16 with the light shielding member 18 therebetween.

The image erase unit 16 essentially comprises a box-shaped casing 62, a plurality (four in FIG. 1) of erase light sources 64a through 64d, a heat radiator means composed of a plurality of discharge fans 66a through 66d positioned on the upper panel of the casing 62, and feed means 68a, 68b located adjacent to openings defined in the casing 62. A bent tenth belt conveyor 70 is disposed adjacent to the feed means 68a and has a bent portion against which a fourth group of rollers 72 is held. A bent eleventh belt conveyor 74 is positioned closely to the tenth belt conveyor 70 and has a belt portion held against a fifth group of rollers 76. Adjacent to the eleventh belt conveyor 74 and the rollers 76, there is provided a bent twelfth belt conveyor 78 having a bent portion held against a sixth group of rollers 80. A bent thirteenth belt conveyor 82 is located adjacent to the twelfth belt conveyor 78 and has a bent portion held in contact with a seventh group of rollers 84.

The radiation image recording and read-out apparatus 10 is basically structured as described above. The image erase unit 16 will be described in greater detail with reference to FIG. 2.

The feed means 68a, 68b are disposed at opposite ends of the casing 62, which houses the first through fourth erase light sources 64a through 64d for emitting erasing light. The erase light sources 64a, 64d are supported in parallel, widely spaced relation on one side panel 90a of the casing 62, and the erase light sources 64b, 64c are supported in parallel, closely spaced relation on the opposite side panel 90b of the casing 62. The erase light sources 64b, 64c are positioned such that they are located between the erase light sources 64a, 64d, when viewed in side elevation. The side panel 90a has a large opening which is openably closed by a cover 92 secured to the side panel 90a by screws. The side panel 90b also has openings 94a, 94b, 94c defined in a lower portion thereof, and forced-cooling air blower means, preferably sirocco fans 96a, 96b, and 96c have projecting outlets extending into the respective openings 94a, 94b, 94c.

A belt conveyor 98 is disposed over the bottom panel of the casing 62 and extends between rollers 100a, 100b of the feed means 68a, 68b. The rollers 100a, 100b are surrounded by cover members 101a, 101b, respectively, having slots 102 for introducing and discharging the stimulable phosphor sheet A into and out of the casing 62. The bottom of the casing 62 is illustrated as being closed by the bottom panel. However, the present invention is applicable to an image erase unit having an open bottom with feed means located below the open bottom, as will be understood from another embodiment described later on.

A motor 103 is fixed to a side panel of the casing 62 and has a rotatable shaft 104 over which a first sprocket 105 is fitted. A chain 106 trained in mesh around the first sprocket 105 is held in mesh with a second sprocket 107 supported coaxially on the roller 100b and extends to the roller 100a where the chain 106 is trained in mesh around a third sprocket 108 supported coaxially on the roller 100a. The chain 106 is also held in mesh with a fourth tensioning sprocket 110 rotatably mounted on the side panel 90a of the casing 62. The fourth sprocket 110 is supported on a shaft 112 movable in an oblong hole 116 defined in a bracket 114 secured to the side panel 90a. Therefore, the chain 106 can be kept under desired tension by the fourth sprocket 110 by moving the shaft 112 in the oblong hole 116. The inner surface of each side panel of the casing 62 has a mirror finish. An upper panel 118 is suspended in the casing 62 and positioned between the erase light sources 64a through 64d and the fan 66a through 66d, the upper panel 118 having a lower surface of a mirror finish. These mirror finish sufaces are effective in reflecting erasing light emitted from the erase light sources 64a through 64d (see FIGS. 2 and 3).

A temperature sensor 120 (FIG. 4) such as a thermistor is disposed in one of a plurality of radial air inlet holes 119 of the sirocco fan 96a. The discharge fans and the sirocco fans can be controlled by the temperature detected by the thermistor 120 through a control circuit shown in FIG. 4.

Figure 4:
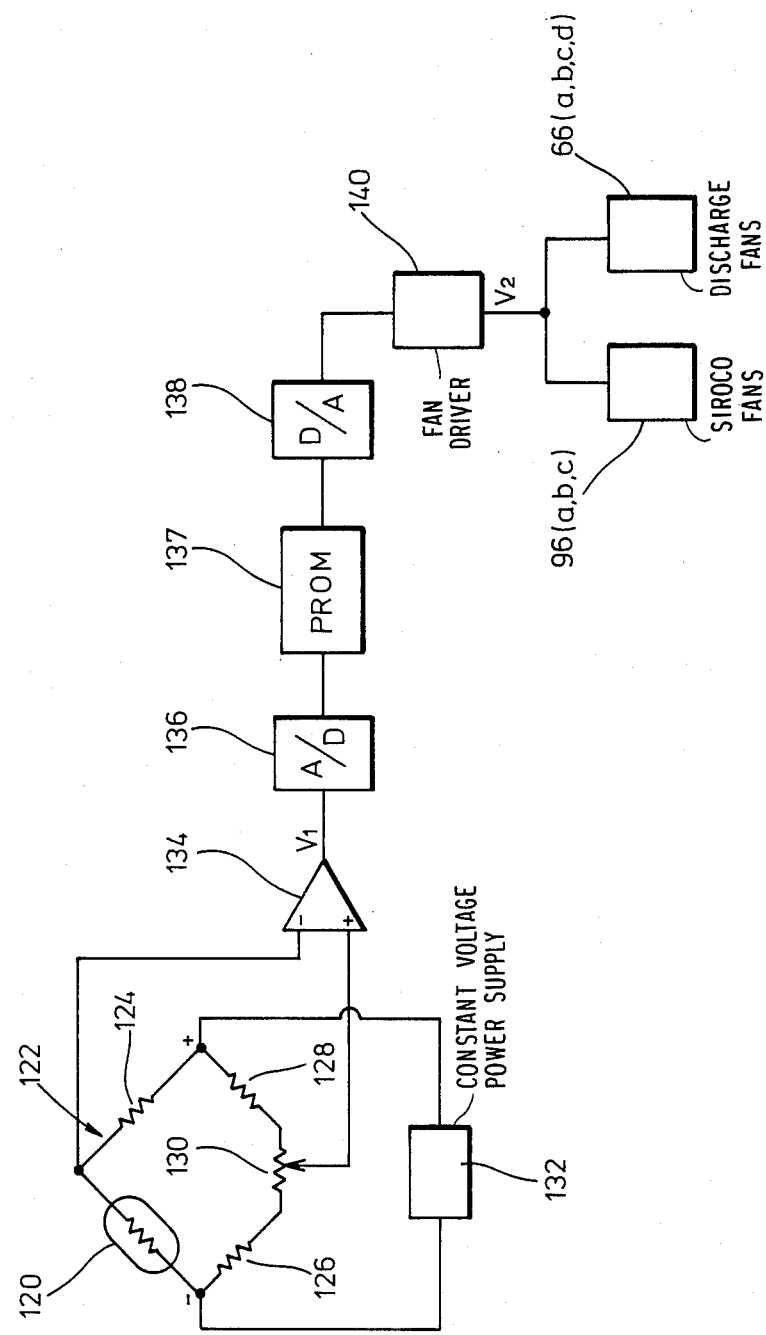
FIG. 4 is a circuit diagram of a control circuit employing a thermistor for controlling sirocco fans and discharge fans.

As shown in FIG. 4, the thermistor 120 is connected as one arm of a bridge 122. The bridge 122 has the thermistor 120, fixed resistors 124, 126, 128, and a variable resistor 130 connected between the fixed resistors 126, 128. The bridge 122 is connected to a constant-voltage power supply 132, and has its output terminals coupled to a differential amplifier 134. The differential amplifier 134 has an output connected via an A/D converter 136 to a programmable read-only memory (PROM) 137 with its output joined via a D/A converter 138 to a fan driver 140. The fan driver 140 has its output connected to the discharge fans 66a through 66d and the sirocco fans 96a through 96c. The PROM 137 stores as a lookup table outputs V1 of the differential amplifier 134 and outputs V2 of the fan driver 140, these outputs V1, V2 being related to each other experimentally.

More specifically, the variable resistor 130 is adjusted to bring the bridge 122 into equilibrium at a desired temperature below the lowest temperature in a ambient-temperature range around the casing 62 which can be detected by the thermistor 120. Then, the outputs V1 from the differential amplifier 134 are detected by varying the ambient temperature around the casing 62. The output V2 from the fan driver 140 is detected which is required to drive the discharge fans 66a through 66d and the sirocco fans 96a through 96d for bringing the surface temperature of the stimulable phosphor sheet while a remaining image is being erased therefrom into comformity with a prescribed temperature with respect to a certain ambient temperature around the casing 62. Thus, the relationship between the ambient temperature and the output V2 from the fan driver 140 can be determined. Accordingly, the relationship between the outputs V1, V2 can be uniquely determined from the relationship between the ambient temperatures and the outputs V1 of the differential amplifier 134 and the relationship between the ambient temperatures and the outputs V2 of the fan driver 140. Such output relationship is stored in the PROM 137.

Operation of the radiation image erase unit 16 of the foregoing construction will be described below.

The object 144 which lies on an upper board 142 of the system 10 is exposed to irradiation emitted from the photographing device 26. Irradiation is transmitted through the object 144 and a radiation image of a desired area of the object 144 is recorded on the stimulable phosphor sheet A on the belt conveyor 20. Irradiation as it passes through the picture-taking plane 24 is prevented by the grid 22 from being scattered. The stimulable phosphor sheet A having recorded the radiation image is then delivered toward the image read-out unit 14. More specifically, the stimulable phosphor sheer A is conveyed via the belt conveyor 28, the bent belt conveyor 30, and the guide plates 34, to the belt conveyor 36. Then, the stimulable phosphor sheet A is fed from the belt conveyor 36 through the belt conveyors 40, 42, 44 to the belt conveyor 48 on which the stimulable phosphor sheet A is positioned. The output laser beam 53 emitted from the laser beam source 52 scans the stimulable phosphor sheet A (primary scanning) as the galvanometer mirror 55 swings back and forth. At the same time, the stimulable phosphor sheet A is fed along by the belt conveyor 48 in a direction substantially normal to the direction of primary scanning to allow the laser beam 53 to scan the stimulable phosphor sheet A (secondary scanning). As a result, light is emitted from the stimulable phosphor sheet A based on image information stored therein, and is collected by a light collecting body 60 and photoelectrically read by a photomultiplier coupled to the light collecting body 60. The photomultiplier then issues an electric image signal which is processed to display a radiation image on a CRT (not shown) or record the same on a recording material such as a photographic photosensitive material. The stimulable phosphor sheet A which still contains remaining image information is fed by the belt conveyor 50 into the image erase unit 16. When the stimulable phosphor sheet A held directly by the feed means 68b is introduced into the casing 62, it is uniformly exposed to erasing light emitted from the erase light sources 64a through 64d. At this time, the discharge fans 66a through 66d and the sirocco fans 96a through 96c are rotated at a speed corresponding to the ambient temperature detected by the thermistor 120 disposed in the air inlet hole 119. Therefore, the heat generated by the light sources 64a through 64d and tending to stay around the stimulable phosphor sheet A is cooled by the sirocco fans 96a through 96c.

The discharge fans 66a through 66d are effective in forcibly discharging the heat out of the casing 62 to keep the stimulable phosphor sheet A at a desired surface temperature while the remaining image is being erased from the stimulable phosphor sheet A. Upon elapse of a certain period of time, the remaining image is substantially thoroughly erased from the stimulable phosphor sheet A, which is then fed out by the feed means 68a onto the belt conveyor 70. The stimulable phosphor sheet A is delivered from the belt conveyor 70 through the belt conveyors 74, 78, 82 so as to be ready for recording a next image thereon. In the embodiment shown in FIG. 2, the angle of the air outlets of the sirocco fans 96a through 96c with respect to the horizon should preferably be in the range of from 5° to 15°. Specifically, stimulable phosphor sheets A of different sizes may be introduced into the casing 62. Since the air outlets of the sirocco fans 96a through 96c are angularly oriented to direct forced air in a vertically fan-shaped pattern, the cooling air from the sirocco fans 96a through 96c can uniformly reach the entire upper surface of the differently sized stimulable phosphor sheets A which may enter the casing 62. Therefore, the stimulable phosphor sheet A can efficiently be cooled by the sirocco fans 96a through 96c.

In the illustrated embodiment, the discharge fans 66a through 66d and the sirocco fans 96a through 96c are simultaneously controlled by the single fan driver 140. However, the sirocco fans 96a through 96c may be rotated at a constant speed, while the discharge fans 66a through 66d may be controlled by the fan driver 140. Alternatively, the discharge fans 66a through 66d may be rotated at a constant speed, while the sirocco fans 96a through 96c may be controlled by the fan driver 140. It is also possible to intermittently inactivate the discharge and sirocco fans. The temperature sensor may be disposed within the casing 62, instead of in the air inlet 120 of the sirocco fan 96a. Where the temperature sensor is located inside the casing 62, it should be located in a position which is close to the stimulable phosphor sheet A but does not interfere with the erasure of the remaining image, and which is not directly affected by the heat from the erase light sources. In the control circuit of FIG. 4, the A/D converter 136, the PROM 137, and the D/A converter 138 may be replaced with a proportional plus derivative controller and an amplifier to provide a feedback control circuit.

Radiation image erase units according to other embodiments will be described with FIGS. 5a, 5b, and 5c.

Figure 5A:
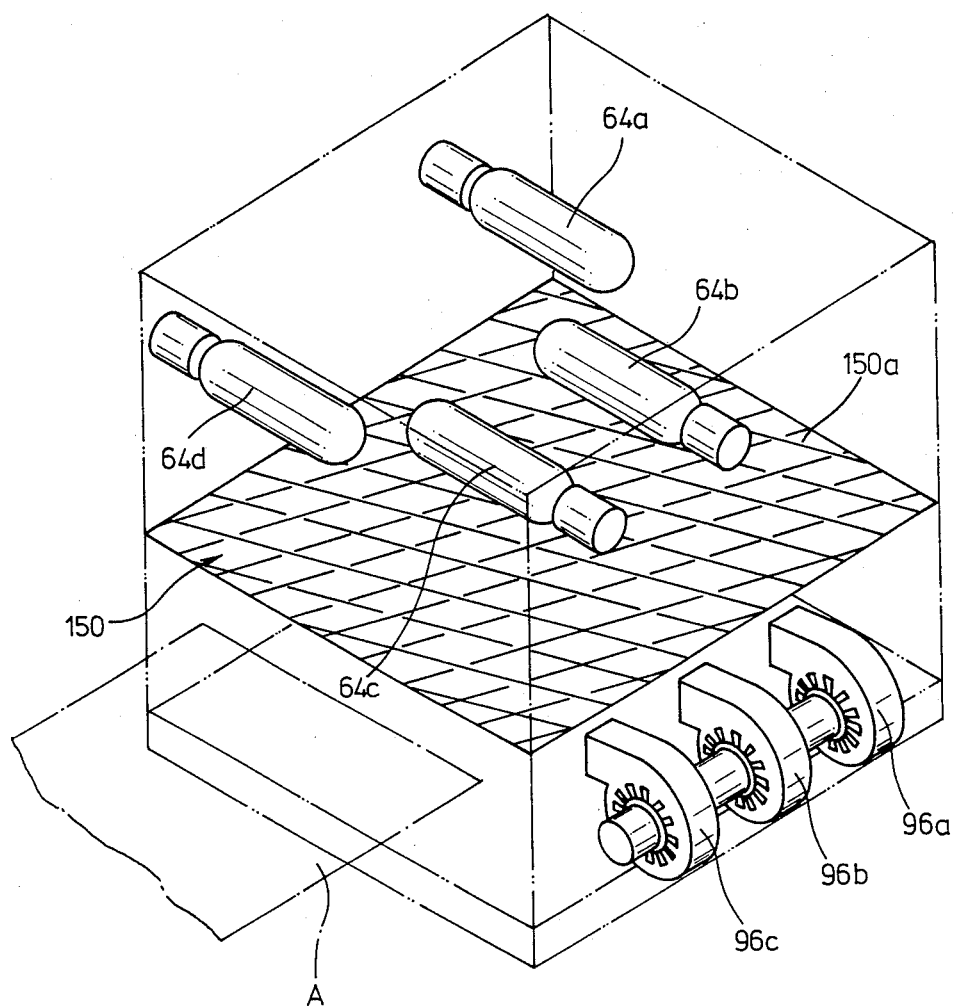
FIGS. 5a, 5b, and 5c are schematic perspective views of radiation image erase units having baffle members according to the invention.
Figure 5B:
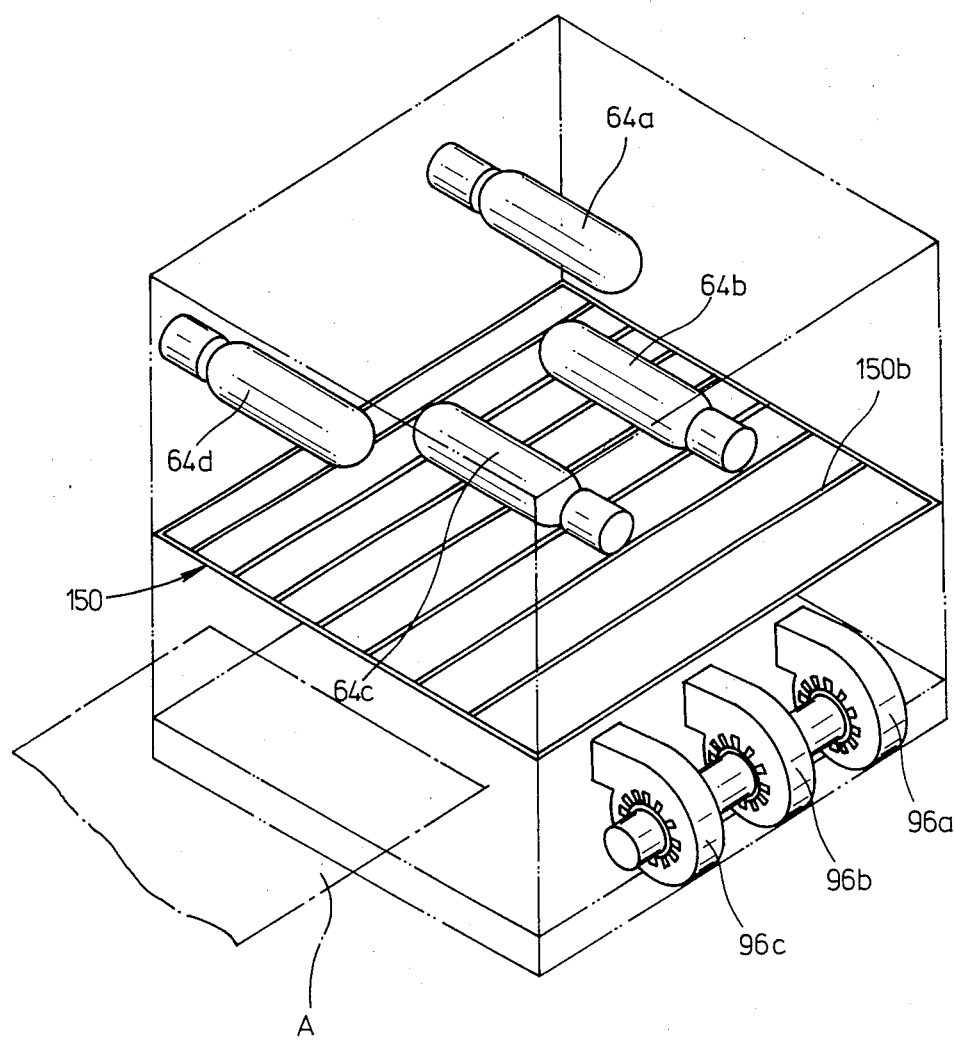
Figure 5C:
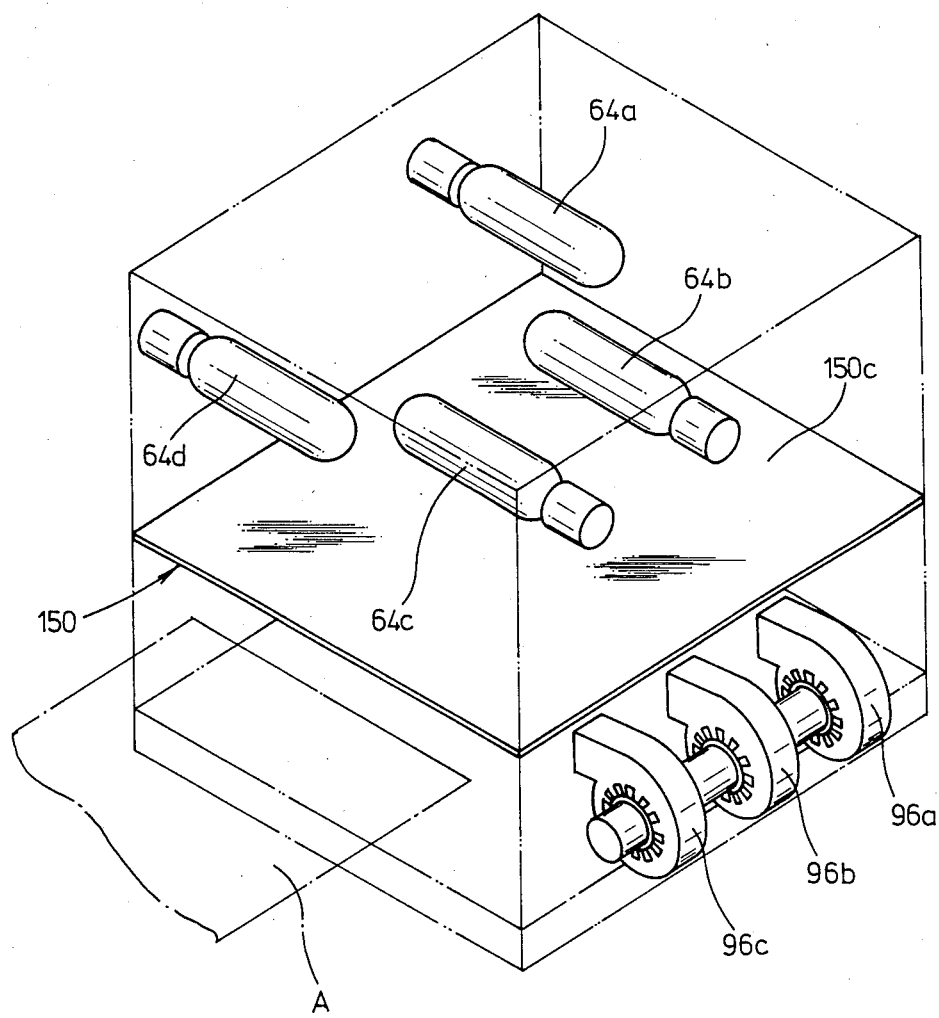

In each of the arrangements of FIGS. 5a, 5b, and 5c, a baffle member 150 is disposed intermediate between the erase light sources 64a through 64d and the sirocco fans 96a through 96c. The baffle member 150 serves to prevent the stimulable phosphor sheet A which is relatively thin from rising or flying up by forced cooling air fed from the sirocco fans 96a through 96c and hence to prevent the stimulable phosphor sheet A from contacting one of the erase light sources 64a through 64d. Therefore, the stimulable phosphor sheet A is prevented from being melted and attached to the erase light sources 64 through 64d or the erase light sources 64 through 64d are prevented from being damaged by the stimulable phosphor sheet A which would otherwise fly up. More specifically, when the sirocco fans 96a through 96c are energized, the stimulable phosphor sheet A in the casing 62 would tend to move up into contact with one of the erase light sources 64a through 64d under the force of the cooling air discharged from the sirocco fans 96a through 96c. However, the baffle member 150 is disposed above the path of travel of the stimulable phosphor sheet A and is effective to prevent the stimulable phosphor sheet A from rising into contact with the erase light sources 64a through 64d. In FIG. 5a, the baffle member 150 is in the form of a heat-resistant wire mesh 150a composed of relatively thick metal wires so arranged to allow the erasing light from the erase light sources 64a through 64d to reach the stimulable phosphor sheet A through the mesh 150a. According to the arrangement of FIG. 5b, the baffle member 150 comprises a plurality of parallel metal wires 150b extending in the direction in which the stimulable phosphor sheet A is fed. The baffle member 150 of metal wires may differently be constructed to prevent the stimulable phosphor sheet A from touching the erase light sources 64a through 64d insofar as the baffle member 150 can transmit the erasing light therethrough.

It is preferable to position the baffle member 150 as closely to the erase light sources 64a through 64d as possible, since the shadow of the baffle member 150 is not liable to affect the stimulable phosphor sheet A and does not prevent the remaining image from being erased from the sheet A. The baffle member 150 may also be in the form of a sheet of heat-resistant glass 150c as shown in FIG. 5c which allows the erasing light to be entirely transmitted therethrough toward the stimulable phosphor sheet A.

With the aforesaid arrangement, the image erase unit can be constructed in a compact design, and the heat generated by the erase light sources upon emission of the erasing light therefrom is prevented from reaching the stimulable phosphor sheet. As a consequence, the stimulable phosphor sheet is effectively prevented from being thermally damaged by the heat from the erase light sources. The reusable stimulable phosphor sheet is therefore durable in use, and the image erase unit itself is also improved in its durability.

Figure 6:
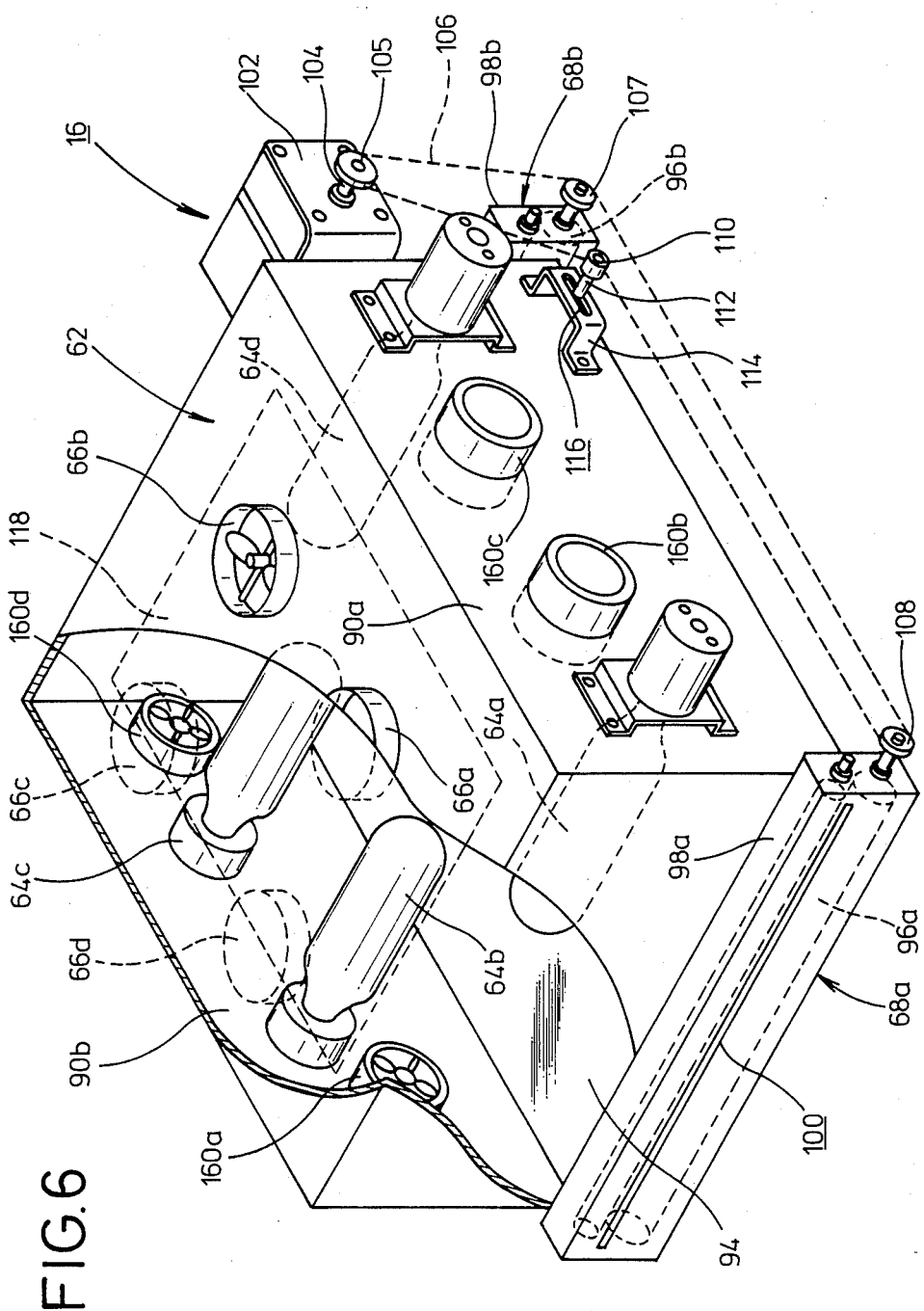
FIG. 6 is a perspective view, partly cut away, of a radiation image erase unit according to another embodiment of the present invention.
Figure 7:
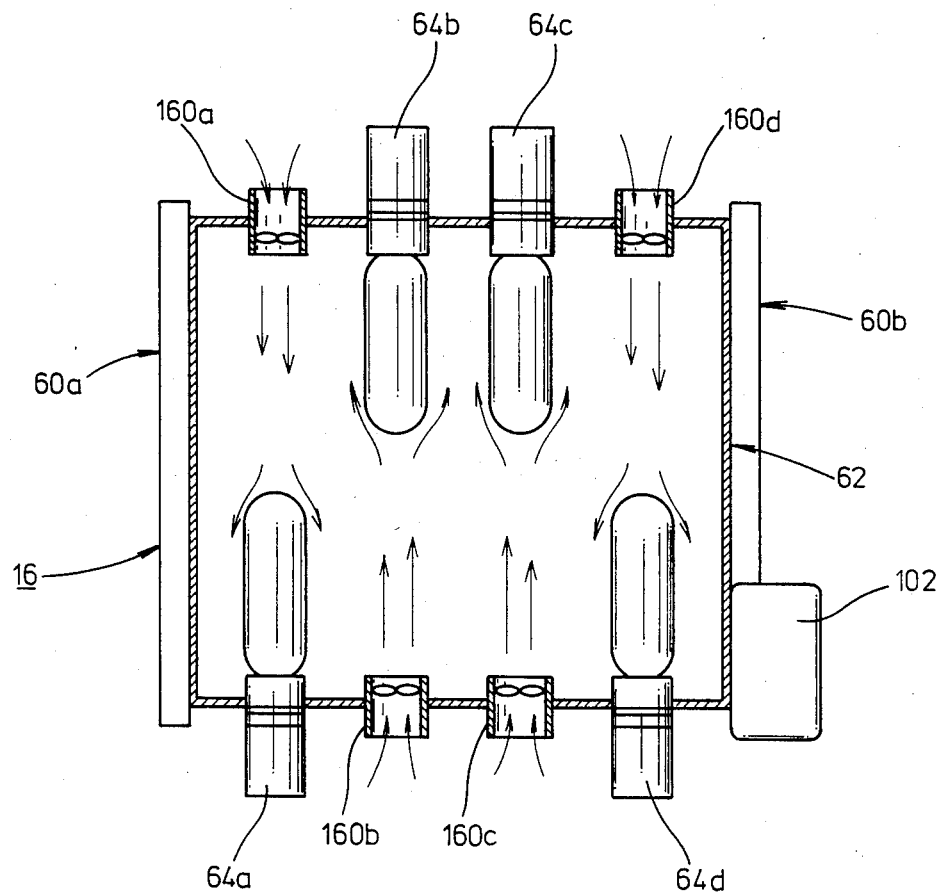
FIG. 7 is a horizontal cross-sectional view showing the relative positional relationship of erase light sources and cooling fans in the radiation image erase unit shown in FIG. 6.
Figure 8:
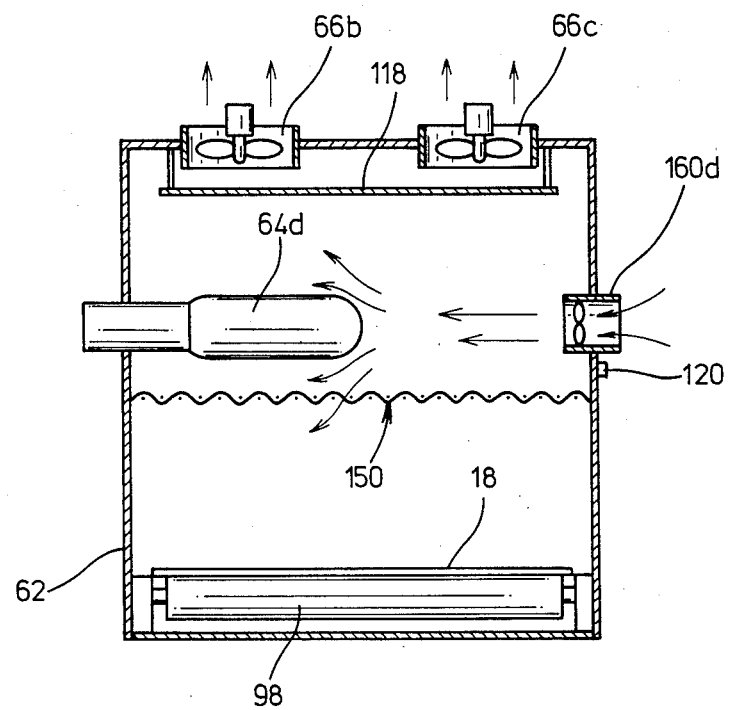
FIG. 8 is a vertical cross-sectional view showing the relative positional relationship of erase light sources, cooling fans, and a baffle member in the radiation image erase unit shown in FIG. 6.

FIGS. 6 through 8 illustrate a radiation image erase unit according to still another embodiment of the present invention.

Figure 2:
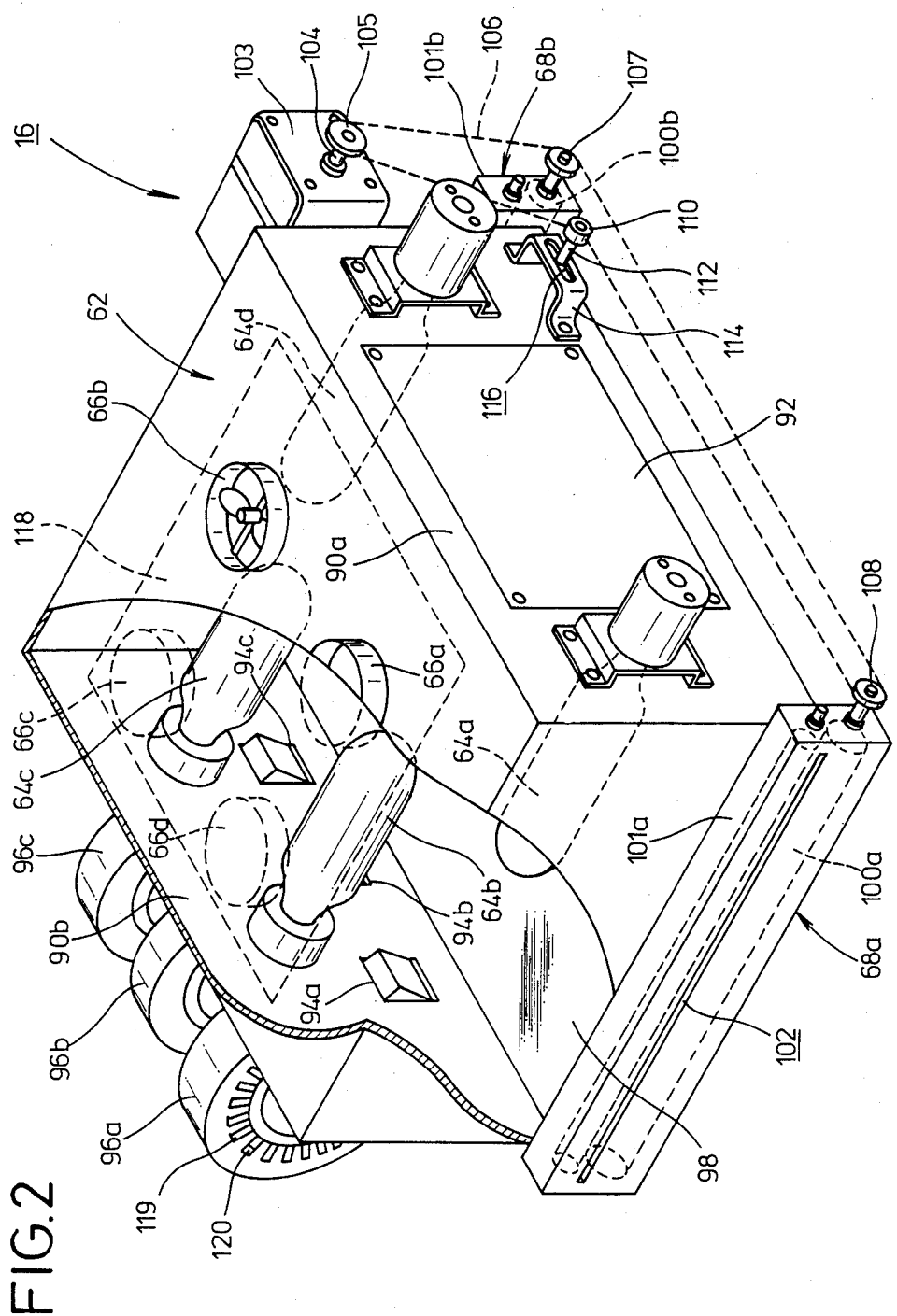
FIG. 2 is a perspective view, partly cut away, of the radiation image erase unit shown in FIG. 1.
Figure 3:
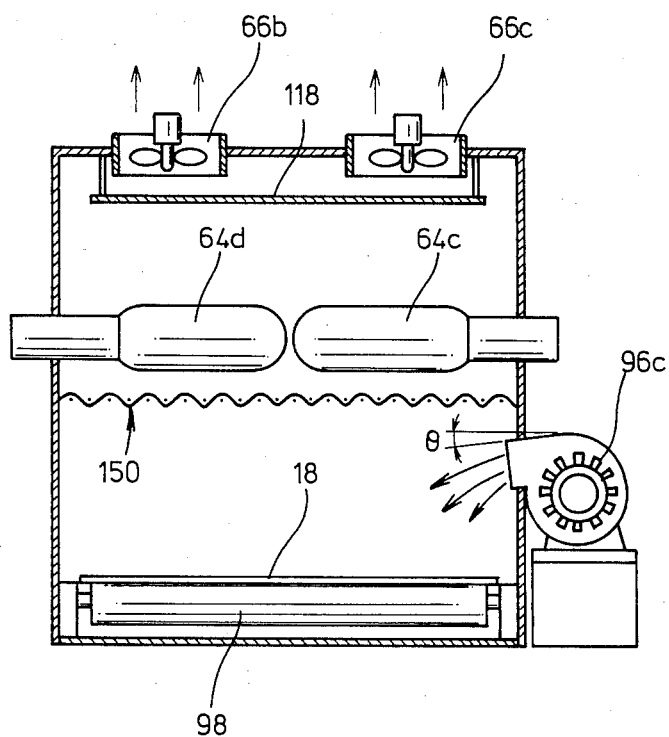
FIG. 3 is a vertical cross-sectional view showing the relative positional relationship of a sirocco fan, a stimulable phosphor sheet, and erase light sources.

The erase light sources 64a, 64d are mounted on the side panel 90a in parallel, widely spaced relation to each other, whereas the erase light sources 64b, 64c are mounted on the opposite side panel 90b in parallel, closely spaced relation to each other, in the same manner as shown in FIG. 2. Cooling fans 160b, 160c are mounted on the side panel 90a between the erase light sources 64a, 64d and positioned in line with the erase light sources 64b, 64c, respectively. Cooling fans 160a, 160d are mounted on the side panel 90b outwardly of the erase light sources 64b, 64c and positioned in line with the erase light sources 64a, 64d.

When the stimulable phosphor sheet A held by the feed means 68a is introduced into the casing 62, the stimulable phosphor sheet A is exposed uniformly to the erasing light emitted from the erase light sources 64a through 64d. Since the erase light sources 64a through 64d are positioned in line with the cooling fans 160a through 160d, respectively, the cooling air is directed by the energized cooling fans 160a through 160d toward the erase light sources 64a through 64d, respectively, which are therefore effectively cooled (FIG. 7). The discharge fans 66a through 66d on the top panel of the casing 62 are simultaneously energized. Consequently, the heat produced by the erase light sources 64a through 64d is cooled by the cooling fans 160a through 160d, and is also dicharged out of the casing 62 by the discharge fans 66a through 66d. As a result, while the stimulable phosphor sheet A is exposed to the erasing light to erase the remaining image therefrom, it is not subject to the heat from the erase light sources 64a through 64d. Therefore, the stimulable phosphor sheet A is kept at a relatively low temperature while it is in the casing 62. When a prescribed period of time has elapsed, the remaining image is substantially fully erased from the stimulable phosphor sheet A, which is then delivered by the feed means 68a onto the belt conveyor 70 and conveyed in the same manner as described with reference to FIG. 1. A temperature sensor, identical to the temperature sensor 120 shown in FIG. 2, may be disposed in the vicinity of the cooling fan 160d, and the cooling fans 160a through 160d may be continuously or intermittently energized dependent on the temperature detected by the temperature sensor.

Figure 9:
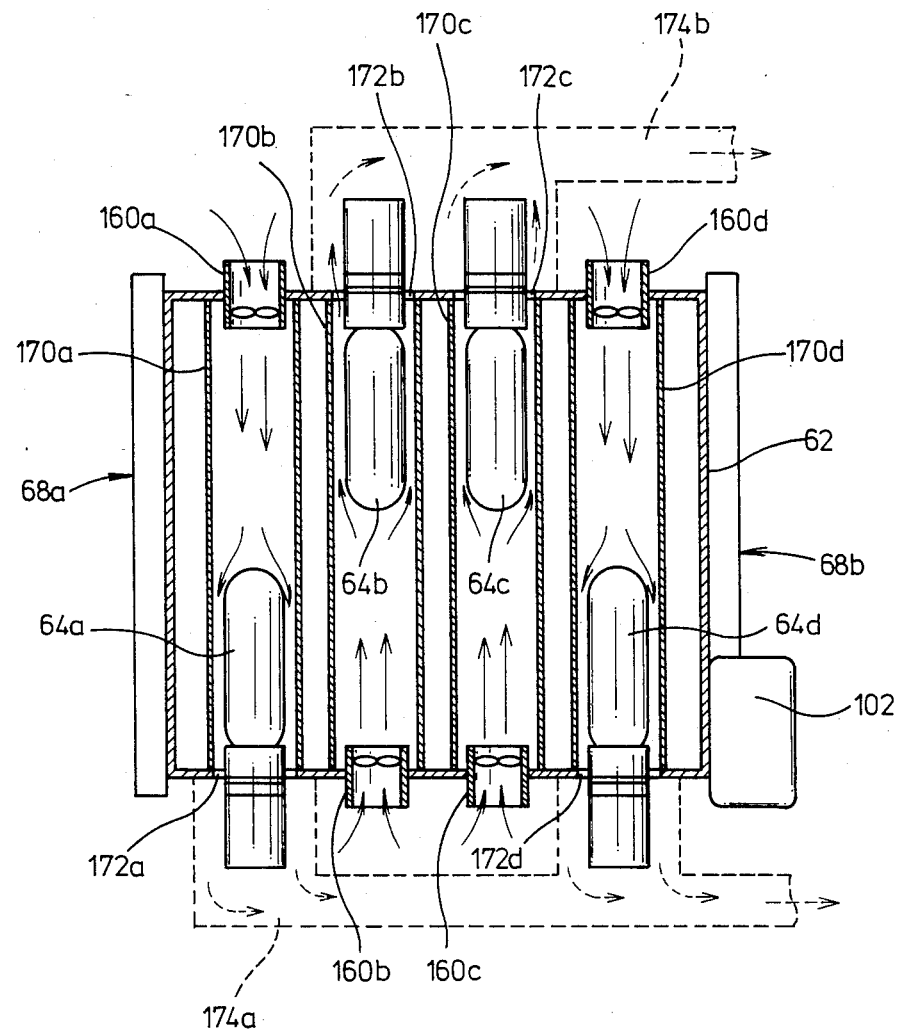
FIG. 9 is a horizontal cross-sectional view showing the relative positional relationship of erase light sources and cooling fans in a radiation image erase unit according to still another embodiment of the invention.

FIG. 9 shows a radiation image erase unit according to still another embodiment of the present invention.

According to this embodiment, any erase light source and a cooling fan confronting the same are surrounded by a single light-transmissive tube. Specifically, the erase light source 64a and the cooling fan 160a are housed in a first light-transmissive tube 170a extending therebetween, and the erase light source 64b and the cooling fan 160b are housed in a second light-transmissive tube 170b extending therebetween. Similarly, the erase light source 64c and the cooling fan 160c are housed in a third light-transmissive tube 170c extending therebetween, and the erase light source 64d and the cooling fan 160d are housed in a fourth light-transmissive tube 170d extending therebetween. The erase light sources 64a through 64d are disposed in openings 172a through 172d, respectively, defined in the opposite side panels of the casing 62 and closed by ducts 174a, 174b.

Cooling air induced by the cooling fans 160a through 160d flows through the tubes 170a through 170d for directly cooling the erase light sources 64a through 64d. The erase light sources 64a through 64d are therefore effectively cooled. The air having cooled the light sources 64a through 64d is discharged out of the casing 62 through the ducts 174a, 174b.

A radiation image erase unit according to a still further embodiment of the present invention is illustrated in FIGS. 10 through 13. The radiation image erase unit of this embodiment has a box-shaped casing having an open bottom. The image erase unit and an image read-out unit jointly constitute a radiation image reproducing system which is separate from an image recording unit.

Figure 10:
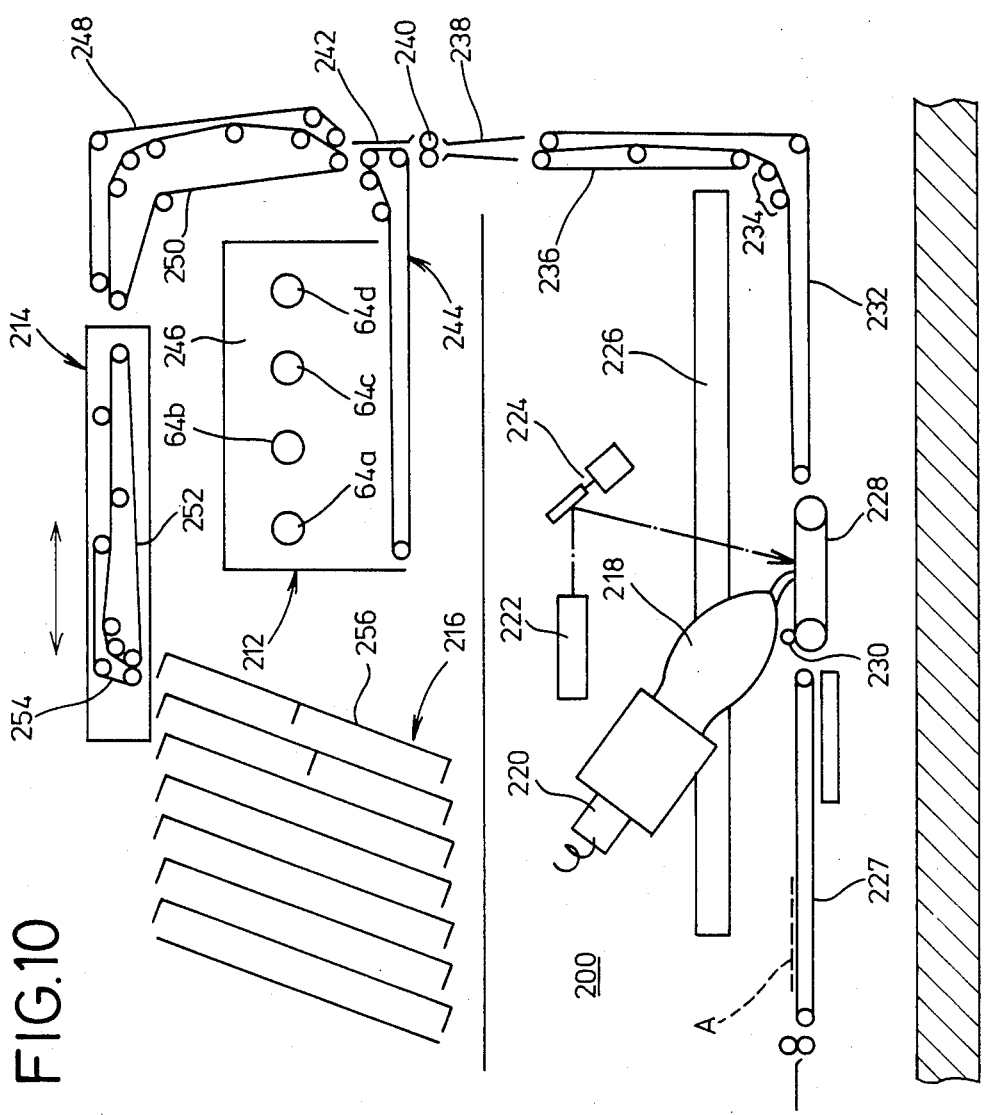
FIG. 10 is a schematic longitudinal cross-sectional view of a radiation image recording and read-out apparatus incorporating a radiation image erase unit according to another embodiment of the present invention.

As shown in FIG. 10, the radiation image read-out apparatus is essentially comprised of an image read-out unit 200, a radiation image erase unit 212 combined with the image read-out unit 200, a selective feed unit 214 for selectively feeding stimulable phosphor sheets, and a sheet sorter 216. The image read-out unit 200 includes a light guide 218, a photomultiplier 220, a laser beam source 222, and a galvanometer mirror 224, which are supported by a fixed optical plate 226 in a spaced fashion. The stimulable phosphor sheet A is fed to the light guide 218 by a first belt conveyor 227 having an outlet end positioned closely to an adjacent second belt conveyor 228 disposed beneath the light guide 218. A nip roller 230 is disposed near one of the rollers of the second belt conveyor 228 for gripping the stimulable phosphor sheet A. The second belt conveyor 228 has an outlet end near a bent third belt conveyor 232 having a bent portion against which a first group of rollers 234 is held. A fourth belt conveyor 236 is located in contact with a portion of the third belt conveyor 232 which extends upwardly beyond the bent portion thereof.

Figure 11:
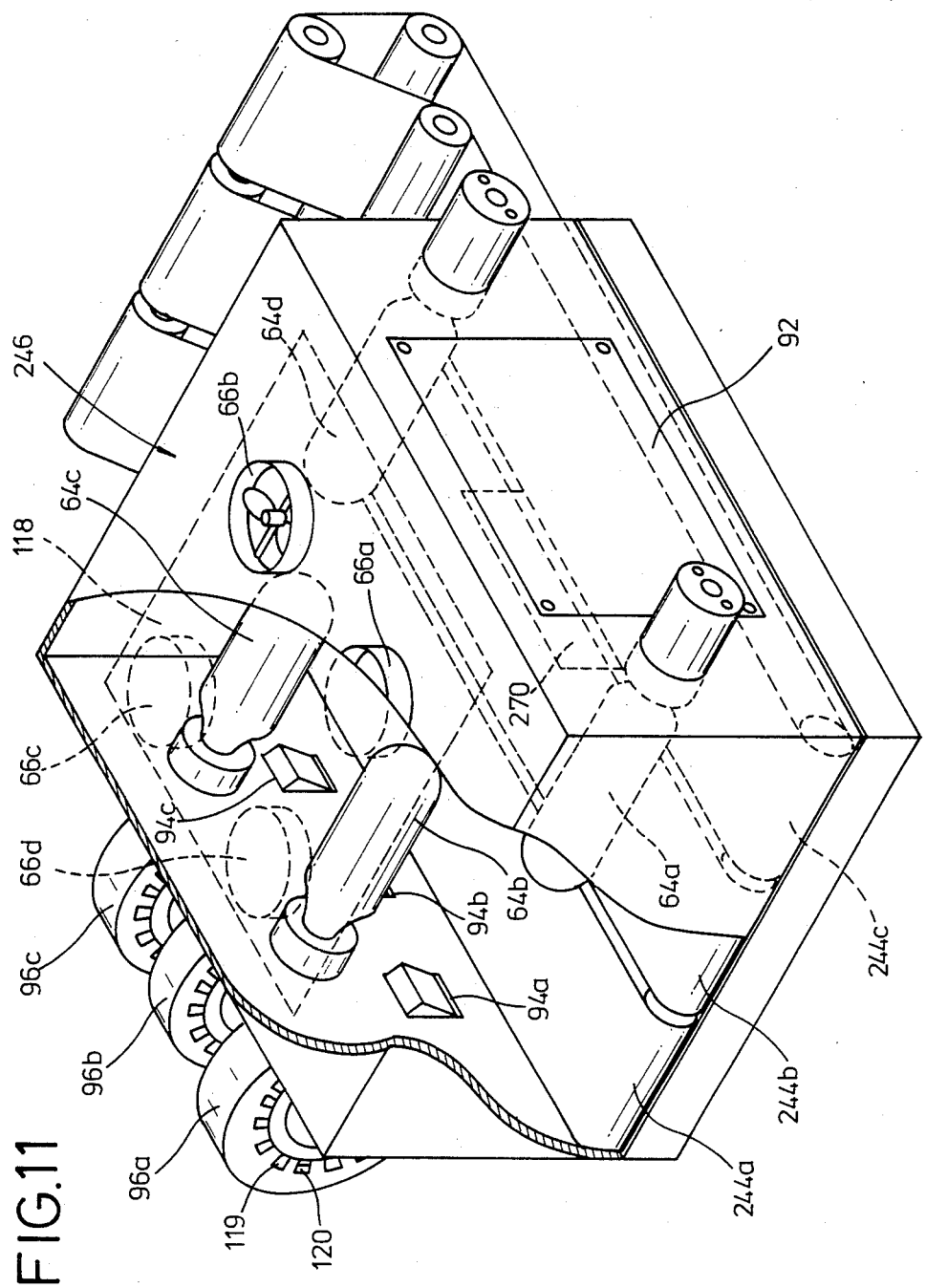
FIG. 11 is a perspective view, partly cut away, of a radiation image erase unit incorporated in the radiation image recording and read-out apparatus illustrated in FIG. 10.

Directly above the third and fourth belt conveyors 232, 236, there are disposed first guide members 238 confronting a second guide member 242 with a pair of rollers 240 interposed therebetween. The second guide member 242 is associated with the image erase unit 212. More specifically, the second guide member 242 is positioned in facing relation to a fifth belt conveyor 244 extending below a casing 246 of the image erase unit 212. As shown in FIG. 11, the fifth belt conveyor 244 is composed of three spaced belt conveyors 244a, 244b, 244c extending in parallel relation.

A bent sixth belt conveyor 248 is positioned directly above the fifth belt conveyor 244 and the second guide member 242, and a bent seventh belt conveyor 250 is held against the sixth belt conveyor 248. The sixth and seventh belt conveyors 248, 250 have outlet ends facing the selective feed unit 214 for sorting stimulable phosphor sheets A according to their size.

The selective feed unit 214 has an eighth belt conveyor 252 and a ninth belt conveyor 254 held in contact therewith, and can itself be moved horizontally in the directions of the arrow. The sorter 216 is disposed below the selective feed unit 214 and composed of a plurality of trays or bins 256 inclined at an angle in parallel relation to each other.

The radiation image erase unit 212 will be described in detail with reference to FIGS. 11 through 13. The radiation image erase unit 212 includes a blow-away prevention device 260 having a blow-away prevention plate for preventing a stimulable phosphor sheet from being blown away in the casing 246. The blow-away prevention plate is vertically displaceable perpendicularly to the direction in which the belt conveyors 244b, 244c are movable in the casing 246.

Figure 12:
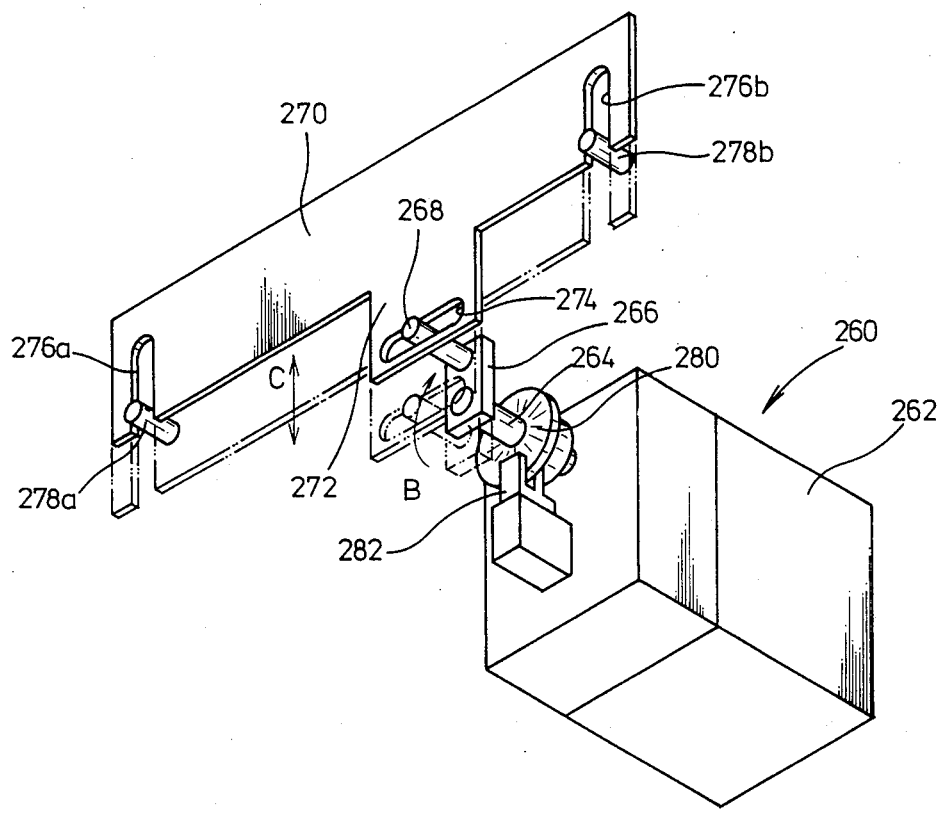
FIG. 12 is a perspective view of a blow-away prevention plate and related devices in the radiation image erase unit shown in FIG. 11.
Figure 13:
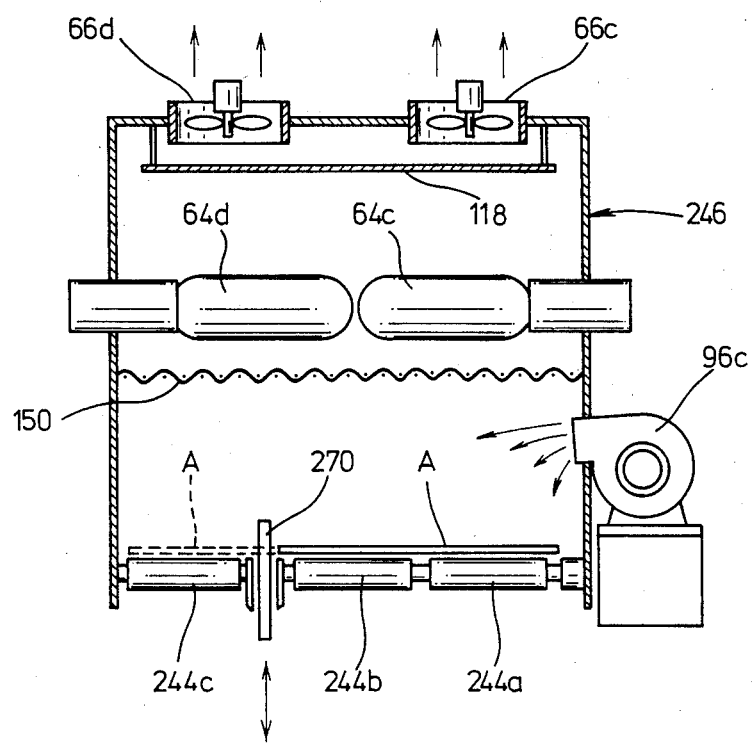
FIG. 13 is a vertical cross-sectional view showing the relative positional relationship of the blow-away prevention plate, a sirocco fan, and erase light sources.

As illustrated in FIG. 12, the blow-away prevention device 260 basically comprises a rotational drive source 262 having a drive shaft 264, an arm 266 fixed to the drive shaft 264, a rod 268 secured to the distal end of the arm 266, and a blow-away prevention plate 270 engaging the rod 268. The blow-away prevention plate 270 includes a projection 272 having a horizontal slot 274 in which the distal end of the rod 268 is slidably fitted.

The blow-away prevention plate 270 also as a pair of downwardly opening grooves 276a, 276b defined in its opposite ends and receiving guide rods 278a, 278b, respectively, fixed to the casing 246. A position detecting disc 280 having radial slits is fixed to the drive shaft 264. A position detector 282 comprising a photosensor is attached to the rotational drive source 262 in sandwiching relation to the disc 280. The position detector 282 is therefore capable of detecting the position of the blow-away prevention plate 270 in response to rotation of the disc 280.

The radiation image erase unit 212 thus constructed will operate as follows:

The stimulable phosphor sheet A storing a radiation image of an object therein is fed by the first belt conveyor 227 and then starts to be fed by the nip roller 230 and the second belt conveyor 228 in the direction of secondary scanning. A laser beam emitted from the laser beam source 222 is reflected by the galvanometer mirror 224, as indicated by the dot-and-dash line, to scan the stimulable phosphor sheet A in the direction of primary scanning. As a result, the stimulable phosphor sheet A emits light upon stimulation by the laser beam, and the emitted light is detected through the light guide 218 by the photomultiplier 220 which converts the light into an electric signal. After the electric signal has been amplified, it is displayed as a visual image on a CRT or a suitable display device, or recorded as image information on a magnetic recording medium.

After the image has been read from the stimulable phosphor sheet A, the sheet A is fed along the bent passage by the third belt conveyor 232, the rollers 234, and the fourth belt conveyor 236. Then, the stimulable phosphor sheet A is delivered via the first guide members 238 and the rollers 240 into the position between the second guide member 240 and the fifth belt conveyor 244. At this time, the sixth belt conveyor 248 and the seventh belt conveyor 250 are driven to rotate by a rotational drive source (not shown) to grip the stimulable phosphor sheet A therebetween. After the stimulable phosphor sheet A has been fed a prescribed distance by being gripped between the sixth and seventh belt conveyors 248, 250, they start being driven in the opposite direction to move the stimulable phosphor sheet A in a switchback path toward the fifth belt conveyor 244. The stimulable phosphor sheet A is therefore delivered by the fifth belt conveyor 244 into the casing 246 of the radiation image erase unit 212.

The size of the stimulable phosphor sheet A introduced into the read-out unit 200 is detected by a size detector (not shown), and a detected size signal from the size detector is temporarily stored in a memory (not shown). Immediately before or after the stimulable phosphor sheet A is introduced into the casing 246, the rotational drive source 262 is controlled by the stored size signal to move the blow-away prevention plate 270 into the casing 246. The belt conveyors 244a through 244c in the casing 246 are selectively driven according to the size of the stimulable phosphor sheet A introduced into the casing 246. More specifically, if the introduced stimulable phosphor sheet A is of a relatively large size, then all of the belt conveyors 244a through 244c are driven to feed the sheet A, and if the introduced stimulable phosphor sheet A is relatively small, only the belt conveyors 244a, 244b are driven to feed the sheet A.

When the detected size signal delivered by the read-out unit 200 to the rotational drive source 262 is indicative of a smaller sheet size which requires only the belt conveyors 244a, 244b to be driven to feed the stimulable phosphor sheet A, then the rotational drive source 262 is driven. However, when the detected signal signal detected by the read-out unit 200 is of a larger sheet size requiring all of the belt conveyors 244a through 244c to be driven, then the rotational drive source 262 is not driven.

If the size signal is applied to drive the rotational drive source 262, i.e., the stimulable phosphor sheet A is fed by the belt conveyors 244a, 244b, then the rotation of the rotational drive source 262 is transmitted to the drive shaft 264 to angularly displace the arm 266 upwardly in the direction of the arrow B from the position indicated by the broken lines in FIG. 12. The rod 268 engaging in the slot 274 is also moved upwardly to lift the blow-away prevention plate 270 in the direction of the arrow C to the solid-line position. As a consequence, the blow-away prevention plate 270 is moved upwardly between the belt conveyors 244b, 244c. The stimulable phosphor sheet A delivered by the belt conveyors 244a, 244b into the casing 246 is therefore positioned between the blow-away prevention plate 270 and the side panel of the casing 246 which has the openings 94a through 94c. The rotational position of the drive shaft 246 is detected by the disc 280 and the position detector 282 such that when the blow-away prevention plate 270 is in its upper limit position, the rotational drive source 262 is de-energized to keep the blow-away prevention plate 270 in its upper limit position.

The stimulable phosphor sheet A thus positioned is then exposed to erasing light emitted from the erase light sources 64a through 64d while the sirocco fans 96a through 96c and the cooling fans 66a through 66d are being driven. Since the erasing light emitted from the erase light sources 64a through 64d is well reflected by the mirror-finish inner surfaces of the side panels of the casing 246, the entire surface of the stimulable phosphor sheet A is fully exposed to the erasing light to erase any remaining image therefrom. Cooling air from the sirocco fans 96a through 96d is forced against the stimulable phosphor sheet A through the openings 94a through 94c to prevent the heat radiated by the erase light sources 64a through 64d from damaging the stimulable phosphor sheet A. The cooling air discharged by the sirocco fans 96a through 96c would tend to blow away the stimulable phosphor sheet A. However, the blow-away prevention plate 270 lifted into the casing 246 is positioned in confronting relation to the openings 94a through 94c for preventing the stimulable phosphor sheet A from being blown away or displaced by the cooling air forcibly discharged from the sirocco fans 96a through 96c. The baffle member 150 (FIG. 13) disposed in the casing 246 prevents the stimulable phosphor sheet A which has been lifted by the air discharged by the sirocco fans 96a through 96c from getting into contact with the erase light sources 64a through 64d.

After the remaining image has been erased from the stimulable phosphor sheet A in a short period of time, the sheet A is delivered back toward the guide member 242 by the belt conveyors 244a, 244b, and then fed by the sixth and seventh belt conveyors 248, 250 to the selective feed unit 214. During this time, the rotational drive source 262 is energized again to lower the blow-away prevention plate 270 to the original position. The selective feed unit 214 grips the delivered stimulable phosphor sheet A between the eighth and ninth belt conveyors 252, 254 and feeds the sheet A in the forward direction while at the same time the selective feed unit 214 itself is moved toward the sorter 216. Then, the selective feed unit 214 stops above a prescribed tray 256 receptive of the detected sheet size, and drives the eighth and ninth belt conveyors 252, 254 to discharge the stimulable phosphor sheet A into the tray 256. The stimulable phosphor sheet A stored in the tray 256 is now ready for recording new image information thereon.

According to the embodiment shown in FIGS. 10 through 13, the radiation image erase unit is compact in structure and has a simple arrangement for cooling the heat radiation from the erase light sources toward the stimulable phosphor sheet and discharging the heat. The radiation image erase unit also has a blow-away prevention unit for effectively preventing the stimulable phosphor sheet A from being displaced by the cooling air. The stimulable phosphor sheets A discharged from the image erase unit can efficiently and accurately be sorted out according to their size. As a result, next image information can be recorded on the sorted stimulable phosphor sheets A without any appreciable trouble. The entire process of recording and reproducing radiation image information is rendered accurate and simple. Since the radiation image erase unit is simple in construction, it can be manufactured inexpensively. The stimulable phosphor sheet can completely be prevented from being positionally displaced in the image erase unit since the sheet is mechanically positioned therein.

Although certain preferred embodiments have been shown and described, it should be understood that many changes and modifications may be made therein without departing from the scope of the appended claims.

What is claimed is:

1. A radiation image erase unit for erasing an irradiation image from a stimulable phosphor sheet by exposing the same to erasure light in a radiation image read-out system having an image read-out unit for radiating stimulating rays to said stimulable phosphor sheet to cause the same to emit light representative of said radiation image stored therein, and for converting said emitted light photoelectrically to an electric signal, said radiation image erase unit comprising: a casing including a side panel having openings defined therein; a plurality of erase light sources disposed in said casing; feed means disposed in or outside said casing for delivering said stimulable phosphor sheet to a prescribed position in said casing; and forced cooling means having outlets disposed in said openings, respectively, of said side panels and directed toward the recording surface of a stimulable phosphor sheet positioned in said casing.

2. A radiation image erase unit according to claim 1, wherein said forced cooling means comprise sirocco fans.

3. A radiation image erase unit for erasing a radiation image from a stimulable phosphor sheet by exposing the same to erasure light in a radiation image read-out system having an image read-out unit for radiating stimulating rays to said stimulable phosphor sheet to cause the same to emit light representative of said radiation image stored therein, and for converting said emitted light photoelectrically to an electric signal, said radiation image erase unit comprising; a casing including a side panel having openings defined therein; a plurality of erase light sources disposed in said casing; feed means disposed in or outside said casing for delivering said stimulable phosphor sheet to a prescribed position in said position in said casing; forced cooling means having outlets disposed in said openings, respectively, of said side panels and directed toward the recording surface of a stimulable phosphor sheet positioned in said casing; and a baffle member disposed in said casing between said erase light sources and said stimulable phosphor sheet positioned in said casing to prevent air flow from said forced cooling means projecting the phosphor sheet against said erase light sources.

4. A radiation image erase unit according to claim 3, wherein said baffle member comprises a heat-resistant wire mesh.

5. A radiation image erase unit according to claim 3, wherein said baffle member comprises a sheet of heat-resistant glass.

6. A radiation image erase unit according to claim 3, wherein said baffle member comprises a plurality of parallel metal wires extending in the direction in which said stimulable phosphor sheet is fed in said casing.

7. A radiation image erase unit for erasing a radiation image from a stimulable phosphor sheet by exposing the same to erasure light in a radiation image read-out system having an image read-out unit for radiating stimulating rays to said stimulable phosphor sheet to cause the same to emit light representative of said radiation image stored therein, and for converting said emitted light photoelectrically to an electric signal, said radiation image erase unit comprising: a casing including a side panel having openings defined therein; a plurality of erase light sources disposed in said casing; feed means disposed in or outside said casing for delivering said stimulable phosphor sheet to a prescribed position in said casing; forced cooling means having outlets disposed in said openings, respectively, of said side panels and directed toward the stimulable phosphor sheet positioned in said casing; discharge means mounted on said casing for forcibly discharging heat out of said casing; and a temperature sensor disposed in or outside said casing for controlling the operation of said forced cooling means and/or said discharge means.

8. A radiation image erase unit according to claim 7, wherein said temperature sensor is disposed outside said casing.

9. A radiation image erase unit according to claim 7, wherein said forced cooling means comprise sirocco fans.

10. A radiation image erase unit according to claim 8, wherein said forced cooling means comprise sirocco fans, said temperature sensor being mounted on one of said sirocco fans.

11. A radiation image erase unit according to claim 10, wherein said temperature sensor is disposed in one of air inlet holes of said one of the sirocco fans.

12. A radiation image erase unit according to claim 11, wherein said temperature sensor comprises a thermistor.

13. A radiation image erase unit for erasing a radiation image from a stimulable phosphor sheet by exposing the same to erasure light in a radiation image read-out system having an image read-out unit for radiating stimulating rays to said stimulable phosphor sheet to cause the same to emit light representative of said radiation image stored therein, and for converting said emitted light photoelectrically to an electric signal, said radiation image erase unit comprising: a casing including a side panel; a plurality of erase light sources disposed in said casing; feed means disposed in or outside said casing for delivering said stimulable phosphor sheet to a prescribed position in said casing; and forced cooling means mounted on said side panel and directed toward said erase light sources.

14. A radiation image erase unit according to claim 13, wherein said erase light sources are mounted on a second side panel opposite to said first-mentioned side panel, said forced cooling means being mounted on said first side panel in line with said erase light sources, respectively.

15. A radiation image erase unit according to claim 13, including a baffle member disposed in said casing, and positioned below said erase light sources and said forced cooling means and above said stimulable phosphor sheet positioned in said casing.

16. A radiation image erase unit according to claim 13, including air passages defined by light-transmissive members and extending between said erase light sources and said forced cooling means.

17. A radiation image erase unit for erasing a radiation image from a stimulable phosphor sheet by exposing the same to erasure light in a radiation image read-out system having an image read-out unit for radiating stimulating rays to said stimulable phosphor sheet to cause the same to emit light representative of said radiation image stored therein, and for converting said emitted light photoelectrically to an electric signal, said radiation image erase unit comprising: a casing including a side panel having openings defined therein; a plurality of erase light sources disposed in said casing; feed means disposed in or outside said casing for delivering said stimulable phosphor sheet to a prescribed position in said casing; forced cooling means having outlets disposed in said openings, respectively, of said side panels and directed toward the stimulable phosphor sheet positioned in said casing; and a blow-away prevention device having a blow-away prevention plate located in confronting relation to said outlets of said forced cooling means and displaceable into said casing dependent on the size of said stimulable phosphor sheet for preventing the stimulable phosphor sheet from being blown away by air discharged by said forced cooling means.

18. A radiation image erase unit according to claim 17, wherein said feed means comprise a plurality of belt conveyors extending in said casing along the direction of feed of stimulable phosphor sheet in said casing, said blow-away prevention plate being vertically movable between adjacent two of said belt conveyors.

19. A radiation image erase unit according to claim 18, wherein said blow-away prevention device comprises a rotational drive source having a drive shaft, an arm coupled to said drive shaft, and a rod fixed to said arm, said blow-away prevention plate having a slot in which said rod slidably engages.

* * * * *